United States Patent [19]

Heidrich et al.

[11] 4,369,369
[45] Jan. 18, 1983

[54] X OR GAMMA RADIATION DETECTOR, PARTICULARLY FOR RADIOLOGY AND A RADIOLOGICAL APPARATUS COMPRISING SUCH A DETECTOR

[75] Inventors: Karl Heidrich, Essen; Lothar Ginzel, Schwerte, both of Fed. Rep. of Germany

[73] Assignee: Thomson-CSF, Paris, France

[21] Appl. No.: 206,286

[22] Filed: Nov. 12, 1980

[30] Foreign Application Priority Data

Nov. 15, 1979 [DE] Fed. Rep. of Germany ....... 2946108

[51] Int. Cl.³ ............................................ H05B 33/00
[52] U.S. Cl. .................................................. 250/484.1
[58] Field of Search ............... 250/483, 484, 487, 488, 250/370

[56] References Cited

U.S. PATENT DOCUMENTS

| | | | |
|---|---|---|---|
| 3,112,404 | 11/1963 | Reed | 250/484 |
| 3,334,229 | 8/1967 | Makino | 250/484 |
| 3,479,515 | 11/1965 | Snavely | 250/484 |
| 3,891,993 | 6/1975 | Beneking | 250/370 |
| 4,250,385 | 2/1981 | Luderer | 250/370 |

OTHER PUBLICATIONS

"Analysis of Photoemissive Schottky Barrier Photodetectors", Dalai, *Jour. of Appl. Phy.*, vol. 42, No. 6, May '1971, pp. 2280-2284.

*Primary Examiner*—Bruce C. Anderson
*Attorney, Agent, or Firm*—Oblon, Fisher, Spivak, McClelland & Maier

[57] ABSTRACT

The detector of the invention relates to the field of X or gamma photon detection. It is particularly adapted as a measuring chamber in conventional radiology and as a detector in scanography.

It comprises at least one transformer for transforming X or gamma photons into light photons and at least one transformer for transforming light photons into electric signals representative of the energy of the incident X or gamma photons. The transformer for transforming X or gamma photons into light photons comprises a photoconducting layer and an electroluminescent layer between two electrodes which are brought to a biasing potential. The transfer electrode may be formed by a Schottky barrier. The transformer for transforming light photons into signals comprises a photosensitive layer, as a photovoltaic cell, on a substrate.

13 Claims, 3 Drawing Figures

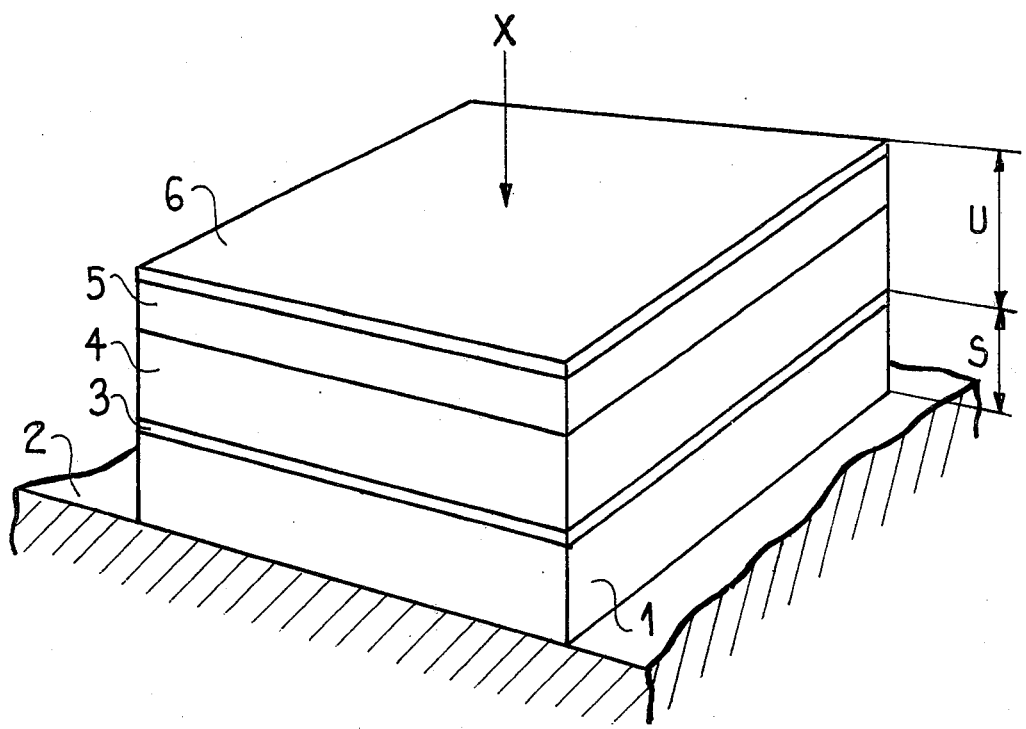
FIG_1
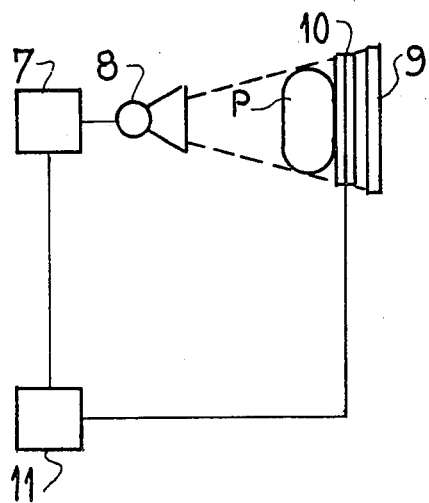
FIG_2
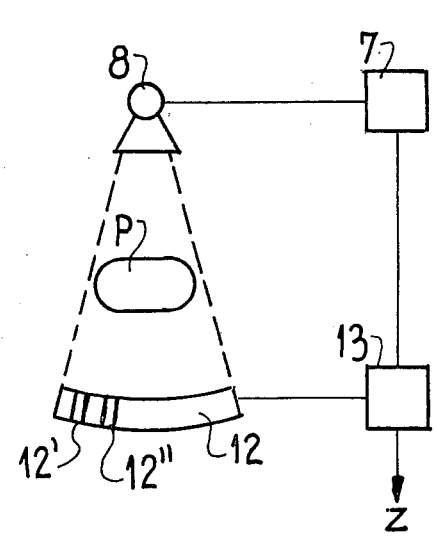
FIG_3

X OR GAMMA RADIATION DETECTOR, PARTICULARLY FOR RADIOLOGY AND A RADIOLOGICAL APPARATUS COMPRISING SUCH A DETECTOR

BACKGROUND OF THE INVENTION

The present invention relates to an X or gamma-radiation detector particularly for radiology. It finds applications not only as a low-absorption measuring chamber but also as a high-efficiency radiation detector.

In the prior art X or gamma photon detectors are known which comprise a scintillator element mounted on a photodetector cell. The scintillator element absorbs a part of the X or gamma photons and transforms them into light photons a part of which is absorbed by a photodetector cell. This latter then supplies an electric signal related to the intensity of the incident X or gamma photon beam with a very short response time of the order of a nanosecond.

The present invention provides a special detector arrangement which improves the efficiency very much and so the response time which drops to the level of a picosecond.

In order to improve the efficiency Published German application DE OS 26 22 655 proposes a series arrangement of scintillators and photodetectors. The sensitivity remains low for a large number of elements. Their thickness makes them unsuitable for use as a measuring chamber between a body to be examined and a radiographic film for example. The film in fact retains a trace of the detector.

SUMMARY OF THE INVENTION

The present invention, for a small thickness, allows a good sensitivity which makes it usable as a measuring chamber. In fact, it comprises at least one transformer for transforming X or gamma radiations into light from the UV band to the IR band and at least one transformer for transforming light into an electric signal. The X or gamma radiation tranformer comprises at least one photoconducting layer and an electroluminiscent layer between a cover electrode and a transfer electrode between which is applied a biasing voltage. The transfer electrode is in communication with the light transformer.

DESCRIPTION OF THE DRAWINGS

The invention will be better understood with the help of the description and the accompanying figures which are:

FIG. 1: a detector constructed in accordance with the invention;

FIG. 2: a radiography apparatus comprising a detector of the invention;

FIG. 3: a tomodensitometer comprising a detector of the invention.

DESCRIPTION OF THE PREFERRED EMBODIMENT

The detector of the invention may comprise, as is shown in FIG. 1, an X or gamma radiation transformer 4, 5 and a light transformer 1. Limiting them are three electrodes, namely: the cover electrode 6, a transfer electrode 3 and a supporting electrode 2. The incident X or gamma radiation penetrates into cover electrode 6 and then passes successively through the radiation transformer 4, 5 then the light transformer 1.

The X or gamma radiation transformer 4, 5 comprises a photoconducting layer 5 and an electroluminescent layer 4 between the cover electrode 6 and the transfer electrode 3. When an X or gamma photon flux reaches radiation transformer 4, 5, it is very little absorbed. The effect obtained is very small, practically negligible. It is advisable to apply between cover electrode 6 and transfer electrode 3 a biasing voltage U having a predetermined value depending on the characteristics of the radiation transformer. The incident X or gamma photons pass through cover electrode 6 with very low absorption. This electrode may, for example, be formed by a thin metal layer deposited by evaporation. The photoconducting layer 5, formed from a semiconductor material, receives the X or gamma photons. Subjected to a predetermined fraction of the U potential it delivers a flux of majority carriers which pass through the transfer electrode 3. In order to reach this electrode, the carrier flux must pass through the electroluminescent layer which then emits a flux of photons in the band going from the ultraviolet UV to that of the infrared IR. A substantial fraction of this flux passes through transfer electrode 3 to reach the light transformer 1. This transformer comprises a photosensitive layer, for example a semiconductor body, which reacts to the photon flux under the photovoltaic effect. This latter allows a signal to be obtained with a low noise voltage. The signal S is measured between supporting electrode 2 and transfer electrode 3 which limit and isolate electrically the so-called photovoltaic cell photosensitive layer 1.

The fraction of the light photon flux emitted by the electroluminescent layer 4, reflected towards the photoconducting layer 5, does not contribute much to increasing the majority carrier flux, for the energy of the light photons is insufficient.

When electroluminescent layer 4 and photosensitive layer 1 are made from semiconductor materials, transfer electrode 3 is a Schottky barrier. In the case where photosensitive layer 1 is formed from a thin layer of polycrystalline amorphous silicon, this barrier may be formed from a platinum film of 100 Å. A detector may thus be constructed having a total thickness of 10 micrometers.

Such a detector may be disposed, as shown in FIG. 2, in a radiology apparatus as a measuring chamber. The very low inherent absorption allows the detector 10 of the invention to be located between the human body to be examined P and an image-producing device 9. The radiation comes from source 8 connected to a generator 7 controllable under the action of a regulator circuit 11 which receives the signal detected by detector 10 of the invention. In radiography, the use of the detector of the invention as a measuring chamber 10, permits the exposure to be adjusted so as to limit the contrasts permitted by the radiological film. In radioscopy, the same installation protects the screen from excessive doses. The very small thickness of measuring chamber 10 results in it leaving no trace on the imaging device 9.

It is also possible to instal, as electroluminescent layer 4, a pn or pin junction diode having predetermined radiation patterns. The photoconducting layer 5 as well as photosensitive layer 1 may be formed from pn diodes. This improves the sensitivity.

In order to improve the efficiency of the detector, it is also possible to superimpose, along the radiation path, several series of radiation transformers each associated with a light transformer. Each association may be separated from the following one by an electrically insulating layer. It is also possible to construct a multi-element detector, the input face of the detector comprising several cover electrodes such as 6, which intercept a more or less wide section of the beam. Each detector element is formed from the previously described device. Each output signal of an element thus corresponds to a characteristic of a fine radiation beam. The dimension of the section of the finest beam possible depends then on that of the smallest detector element possible.

A multidetector element in accordance with the invention may be fitted in a tomodensitometer shown schematically in FIG. 3. A radiation source 8 emits a flat fan-shaped beam of said radiation towards a section P of the body of a patient to be examined. The beam rays impact on multi-element detector 12. This detector 12 comprises several elements 12', 12", placed side by side so as to intercept all or part of the fan-shaped beam. The output signals S of detector 12 are used in a circuit 13 which, on the one hand controls a radiological generator 7 which supplies source 8 not only in emission but also in direction, and on the other hand supplies signals of tomodensitometric data to a chain Z for processor image reconstruction, according to known means and processes.

Detector 12 may be in the form of an arc of a circle, the image reconstruction of a section requiring rotation of the source 8-detector 12 unit about the flat section of body P to be examined. It may also be in the form of a circular ring in the center of which the patient P is situated and inside which the radiation source 8 rotates.

The present invention finds applications in all X or gamma photonic radiation measurement fields.

What is claimed is:

1. A X or gamma radiation detector comprising:
   at least one first transformer for transforming X or gamma radiation into light going from the UV band to the IR band wherein said first transformer comprises at least one photoconducting layer and an electroluminescent layer between a cover electrode and a Schottky barrier transfer electrode having a biasing voltage applied between said cover electrode and said transfer electrode; and
   at least one of a second transformer for transforming light from said transfer electrode into electrical signals.

2. The detector as claimed in claim 1, wherein the transformer for transforming light into electrical signals is a photovoltaic cell.

3. The detector as claimed in claim 1, wherein the photoconducting layer is a semiconductor body.

4. The detector as claimed in claim 3, wherein the photoconducting layer is a p-n diode.

5. The detector as claimed in claim 3, wherein the photoconducting layer is a p-i-n diode.

6. The detector as claimed in claim 1, wherein the electroluminescent layer comprises a p-n junction.

7. The detector as claimed in claim 1, wherein the electroluminescent layer comprises a p-i-n junction.

8. The detector as claimed in claim 2, wherein the photovoltaic cell comprises a film formed from a polycrystalline amorphous layer.

9. The detector as claimed in claim 8, wherein the polycrystalline amorphous layer is made from silicon.

10. The detector as claimed in claim 1, wherein the radiation transformer then the light transformer are placed successively one behind the other in the radiation path.

11. The detector as claimed in claim 1, wherein there is provided a series of radiation transformers alternating with light transformers along the radiation path, each association being separated from the following one by an electrically insulating and radiation conducting layer.

12. The detector as claimed in claim 1, wherein there is further provided a plurality of detector elements so as to intercept a section of the radiation beam, each of the elements comprising at least one radiation transformer and at least one light transformer.

13. A radiography apparatus comprising:
   a radiation detector as claimed in claim 1 wherein said radiation detector is formed of thin-film transformers and is used as a measuring chamber and further wherein said detector is located between a body to be examined and an imaging device in the path of the radiation coming from a source adjusted by a radiological generator which received control signals from a regulation circuit which limits the exposure of the imaging device.

* * * * *